CHECK CIRCUIT FOR OPTICAL READER EMPLOYING THRESHOLD AMPLIFIER
Filed Aug. 12, 1965
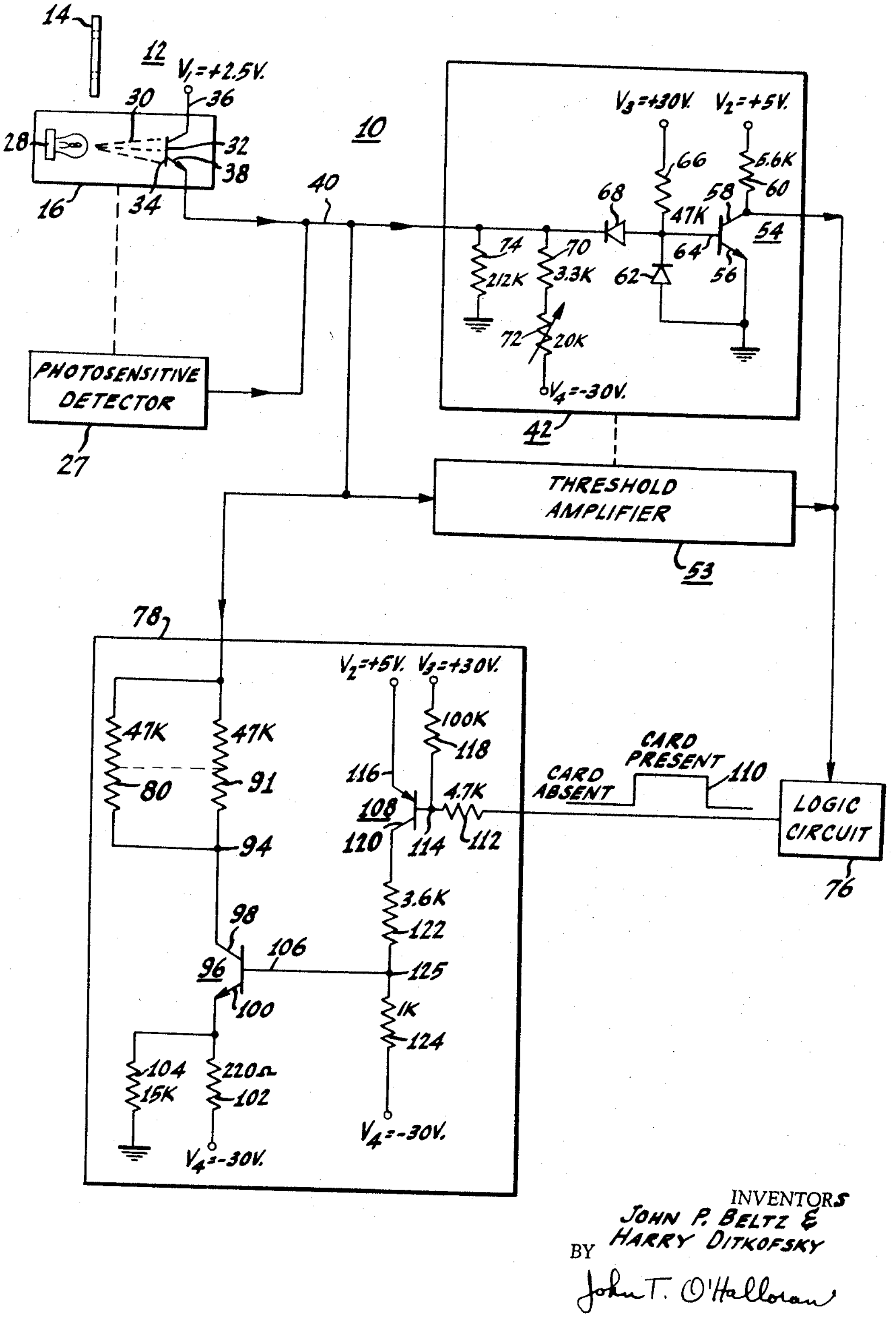
INVENTORS
JOHN P. BELTZ &
HARRY DITKOFSKY
BY
John T. O'Halloran
Attorney

United States Patent Office 3,321,637

Patented May 23, 1967

3,321,637

CHECK CIRCUIT FOR OPTICAL READER EMPLOYING THRESHOLD AMPLIFIER

John P. Beltz, Willingboro, and Harry Ditkofsky, Cherry Hill, N.J., assignors to Radio Corporation of America, a corporation of Delaware Filed Aug. 12, 1965, Ser. No. 479,207
6 Claims. (Cl. 250—219)

This invention relates to optical readers, and more particularly relates to circuits for dynamically checking, before the commencement of a read operation, the reliability of the photosensitive read circuits in such readers.

The optical reading of a coded document, such as a punched card, may not be accurate because the amplitude of the sense signal derived from reading the document may be too small to insure reliability. Such a low amplitude sense signal may result from the accumulation of dirt on the reading lamps; the aging of these lamps; or the deterioration of the photosensitive detector that detects the light beams generated by the reading lamps. It is a common practice in optical reading apparatus to periodically check the reading circuit to insure reliability. The apparatus is then operated without a circuit check between the check periods. During the interim between check periods errors may occur without detection. Other checks such as program checks and parity checks often are relied on to catch the majority of errors. It would be advantageous to provide an arrangement for checking the reliability of the reading circuitry prior to the reading of every document.

Accordingly, it is an object of this invention to provide a new and improved check circuit for an optical reader.

It is another object of this invention to provide a check circuit which dynamically checks the reading reliability of a punched card reader immediately prior to the reading of every card.

An optical reader in accordance with the invention includes a photosensitive detector that produces a sense signal in response to a light signal from or through a coded document. The reader also includes an amplifier for producing a read signal when the sense signal exceeds a predetermined threshold. To check the level of the sense signal to insure reliable reading, an impedance is switched in parallel across the amplifier to divert a substantially fixed amount of the sense signal away from the amplifier in the absence of a document at the read station. If the remaining portion of the sense signal is sufficient to exceed the predetermined threshold, the reading circuit is considered reliable. The impedance is switched out of the circuit upon the arrival of any document at the read station and all of the sense signal is applied to the amplifier during the reading of this document. Such a high level sense signal insures reliable operation. Alternatively, if the remaining portion of the sense signal is below the threshold of the amplifier, a signal is generated signifying this. Thus, the check circuit insures that a sufficiently high level sense signal is available just prior to reading every document to insure reliable reading of the documents as they arrive at the reading station of the reader.

The sole figure of the drawing is a schematic block diagram of the reading circuits of an optical reader.

Referring now to the drawing, a portion of an optical reader 10 in accordance with the invention is illustrated. The optical reader 10 includes a reading station 12 for reading coded documents which may, for example, comprise punched cards 14. A standard punched card 14 may, for example, be 80 columns long and 12 rows high. The reading station 12 includes, in the case of a row reader, twelve photosensitive row punch detectors 16 through 27. There is one row punch detector for each row in a punched card. The intermediate detectors 17 through 27 are represented by a dotted line in the drawing for convenience. The row detector 16 includes a lamp 28 for generating a light beam 30 and a light sensitive detector such as a phototransistor 32 for detecting the light beam 30. The row detectors 17 through 27 are constructed similarly to the detector 16. The top row in the punched cards 14 is read by transporting the cards past the front of the lamp 28 so that the light beam 30 from the lamp penetrates through a card 14 if a punch is formed in the top row thereof. The other rows of the cards 14 are read by the detectors 17 through 27 so that the twelve rows in each column of a card 14 are read simultaneously. The phototransistor 32 has a photosensitive base 34, a collector 36, which is connected to the positive potential terminal of a power supply $V_1$, and an emitter 38, which is connected to a bus line 40. The photosensitive base 34 includes an aperture (not shown) for permitting the energizing light beam 30 from the lamp 28 to penetrate therethrough and generate a sense signal. Each emitter of the phototransistors in the detectors 17 through 27 is coupled to one lead in the bus line 40 and each collector of these detectors is coupled to the power supply $V_1$. It is understood that other arrangements of photosensitive detectors may be employed with the present invention and the row detector 16 just described is exemplary.

Each lead in the bus line 40 is also coupled to one of twelve threshold amplifiers 42 through 53. The intermediate amplifiers 43 through 53 are represented by the dotted line in the drawing. The first row threshold amplifier 42 coupled to the first row detector 16 includes a transistor 54 having an emitter 56 coupled to a point of reference potential or ground in the circuit and a collector 58 coupled through a load resistor 60 to the positive terminal of a power supply $V_2$. The emitter 56 is coupled to the anode of a diode 62, the cathode of which is connected to the base 64 of the transistor 54. This connection prevents the base 64 from dropping substantially below ground. A resistor 66 is coupled between the positive potential terminal of a power supply $V_3$ and the base 64 of the transistor 54. The anode of a diode 68 is connected to the base 64 of the transistor 54 whereas the cathode of the diode 68 is coupled through a fixed resistor 70 and a potentiometer 72 to the negative potential terminal of a power supply $V_4$. The cathode of the diode 68 is also coupled to the bus line 40 as well as through a resistor 74 to ground. The resistor 74 is used to speed up the turn-off time of the transistor 54 whereas the biasing network including the power supplies $V_3$ and $V_4$, the resistors 66 and 70, the potentiometer 72 and the diode 68, establish a threshold for the amplifier 42. The potentiometer 42 permits altering the threshold level and the fixed resistor 70 limits the phototransistor 32 dissipation by establishing the maximum phototransistor current. The read signal output of the transistor 54 is derived from the collector 58 of the transistor 54 and is applied to logic circuits 76 of the equipment employing the document reader, such as a digital equipment. The transistor 54 is cut off when the phototransistor 32 is in darkness and is activated when the sense signal from the phototransistor 32 exceeds the threshold of the amplifier 42.

A check circuit 78 is included in the card reader 10 to dynamically precheck the reliability of the read circuits prior to the reading of each card. The check circuit 78 includes twelve impedance elements 80 through 91, one for each of the twelve photosensitive detector-threshold amplifier combinations. The impedance elements 80 through 91, which are shown as resistors in the drawing, each have one terminal thereof connected to separate ones of the leads in the bus line 40 that connect the detectors 16 through 27 to corresponding threshold amplifiers 42 through 53. The other terminal of each of the impedances 80 through 91 is connected to a common point 94 which is switched to a reference potential level by a switch transistor 96. Thus, each of the resistors 80 through 91 is effectively connected in shunt with a corresponding photosensitive detector-threshold amplifier combination when the switch transistor 96 is closed (i.e. activated) because the input circuit of each threshold amplifier is connected to the same reference potential level as the switch transistor 96 (i.e. the power supply $V_4$).

The transistor 96 includes a collector 98 directly connected to the common point 94 and an emitter 100 connected through a resistor 102 to the negative potential terminal of the power supply $V_4$. Thus, the impedance element 80 is connected directly in the current conductive path of the transistor 96. The emitter 100 is also connected to ground through a resistor 104. The resistors 102 and 104 form a voltage divider for biasing the switch transistor 96 to cut-off in the absence of a drive signal applied to the base 106 thereof.

The drive signal is generated in a drive transistor 108 when the logic circuits 76 signal the absence of a card 14 in the reading station 12 by means of the low level of a signal 110. The signal 110 is a two-elevel signal being high when a card is present and low when a card is absent. The signal 110 is applied through a coupling resistor 112 to the base 114 of the drive transistor 108. The emitter 116 of this transistor is coupled directly to the positive potential terminal of the power supply $V_2$. The base 114 is biased by coupling it through a resistor 118 to the positive potential terminal of the power supply $V_3$. The collector 120 of the transistor 108 is coupled through the serial combination of resistors 122 and 124 to the negative potential terminal of the power supply $V_4$. The junction 125 of the resistors 122 and 124 is coupled to the base 106 of the switch transistor 96.

When a punched card is being read, the check circuit 78 and consequently the shunt resistors 80 through 91 are disconnected from the photosensitive detectors and threshold amplifiers. However, when a card is absent, the resistors 80 through 91 are each shunted across a corresponding photosensitive detector-threshold amplifier combination and divert current derived from the photosensitive detectors away from the threshold amplifiers. When the remaining current is insufficient to activate any one of the amplifiers 42 through 53 due to the thresholds established therein, then the logic circuits 76 signal this failure. The logic circuits 76 may, for example, include a gating circuit activated during the card absent level of the signal 110 to determine if each of the amplifiers 42–53 produce an output of a preset level.

In more detail, the low level of the signal 110 is applied to the base 114 of the transistor 108 when a card is absent from the reading station 12 and forward biases this transistor to conduction. The junction point 125 goes sufficiently positive to drive the base of the switch transistor 96 more positive than the emitter 100 thereof. Thus, the transistor 96 conducts and effectively connects each one of the resistors 80–91 to a common point, i.e., the power supply $V_4$.

The light beam 30 emanating from the lamp 28 activates the photosensitive transistor 32 to produce a sense signal current in the emitter 38 thereof. The sense signal divides itself proportionately between the impedance 80 and the amplifier 42 based on the relative values of resistance exhibited by the input circuit of the amplifier 42 and the resistance of the impedance 80. If the amount of light emitted by the lamp 28 is reduced due to dirt, aging, etc., the sense signal derived from the phototransistor 32 is not sufficient to exceed the threshold of the amplifier 42. Similarly, if either the phototransistor 32, or the transistor amplifier 42, is malfunctioning, then the absence of a read signal from the amplifier 42 causes the logic circuits 76 to signal this malfunctioning.

When a card is present in the reading station 12, the logic circuits 76 change the signal 110 to a high level which signal level reverse biases and turns off the drive transistor 108. The collector 120 of this transistor and the junction point 125 therefore go negative which in turn reverse biases the base-emitter junction of the switch transistor 96. Consequently, the switch transistor 96 opens (i.e. turns off) and disconnects the check circuit 78 from the threshold amplifiers. The diverted current that formerly flowed through the switch transistor 96 is now applied to the threshold amplifier 42 to insure that a high level sense signal is always applied through the punches of a card to the threshold amplifier when a card is being read. Thus, the threshold amplifier 42 receives the entire sense signal when a card punch is being read but only a portion of this signal when the card is absent. It is to be noted that the phototransistor 32 is substantially a constant current source for any short time period so that there is a true diversion when the impedances 80 through 91 are switched into the read circuits. It is also to be noted that the impedances 80 through 91 are of relatively high values to prevent a sneak current from one phototransistor from actuating a non-corresponding threshold amplifier. The values of the component of a read circuit constructed in accordance with the invention are shown in the drawing.

Thus, in accordance with the invention, a dynamic checking circuit for an optical card reader is provided. The checking circuit checks the reading circuits of the card reader before each card is read and signals to prevent reading if the read circuits are not operating on a reliable level.

What is claimed is:

1. In an optical document reader including a reading station containing a photosensitive detector for detecting light signals corresponding to data recorded on said documents to produce a sense signal, the combination comprising, a threshold amplifier coupled to said photosensitive detector to produce a read signal when said sense signal exceeds the threshold of said amplifier, and means for switching a portion of said sense signal away from said amplifier in the absence of a document in said reading station.

2. In an optical document reader including a reading station containing a photosensitive detector for detecting light signals corresponding to data recorded on said documents to produce a sense signal, the combination comprising, a threshold amplifier coupled to said photosensitive detector to produce a read signal when said sense signal exceeds the threshold of said amplifier, means for switching a portion of said sense signal away from said amplifier in the absence of a document in said reading station, and means for determining if the remainder of said sense signal exceeds the threshold of said amplifier.

3. In an optical document reader including a reading station containing a photosensitive detector for detecting light signals corresponding to data on said documents to produce a sense signal, the combination comprising, an amplifier exhibiting a predetermined threshold coupled to said photosensitive detector to produce a read signal when said sense signal exceeds said threshold, an impedance and a switch connected in series, means coupling the serial combination of said switch and said impedance across said threshold amplifier, and means for periodically activating said switch to divert a substantially fixed portion of said sense signal away from said threshold amplifier to determine if the remaining portion of said sense signal exceeds said threshold.

4. In an optical document reader including a reading station containing a photosensitive detector for detecting light signals corresponding to data on said documents to produce a sense signal, the combination comprising, an amplifier exhibiting a predetermined threshold coupled to said photosensitive detector to produce a read signal when said sense signal exceeds said threshold, means coupled to said photosensitive detector for switching a portion of said sense signal away from said threshold amplifier each time the absence of a document is detected at said reading station, and means coupled to said thershold amplifier for signaling when the diverted amount of said sense signal prevents the remainder of said sense signal from exceeding said predetermined threshold.

5. In an optical document reader for reading documents, the combination comprising, a phototransistor for detecting light signals corresponding to data on said documents to produce a sense signal, an amplifier exhibiting a predetermined threshold and having an input circuit coupled to said phototransistor to provide a read signal when said sense signal exceeds said threshold, a switch transistor exhibiting a current conductive path, a resistor connected in series with the current conductive path of said transistor, means connecting the serial combination of said transistor and said resistor in parallel with the input circuit of said threshold amplifier, and means for activating said switch transistor prior to the reading of every document to divert a portion of said sense signal through said switch transistor and said resistor to determine if the remaining portion of said sense signal exceeds said threshold.

6. In an optical card reader for reading punched cards having openings punched at the intersection of a plurality of rows and columns formed on said card, to store data on said cards, the combination comprising, a plurality of phototransistors, one for each of said rows for detecting light transmitted through said openings to produce sense signals, a plurality of amplifiers, one for each of said phototransistors with each exhibiting a predetermined threshold, means for coupling each of said amplifiers to a corresponding phototransistor to produce a read signal when said sense signals exceed said threshold, a plurality of resistors, one for each of said amplifiers with each having one of two terminals coupled to a corresponding amplifier, a switch having one terminal coupled to each of said amplifiers and the other terminal coupled to the second terminal of each of said resistors, and means for closing said switch prior to the reading of every punched card to divert portions of said sense signals away from corresponding amplifiers to determine if the remaining portions of said sense signals exceed the threshold of the corresponding amplifiers.

References Cited by the Examiner

UNITED STATES PATENTS

| | | | |
|---|---|---|---|
| 2,677,815 | 5/1954 | Brustman | 250—219 |
| 2,687,253 | 8/1954 | McMillan | 235—61.115 |
| 3,189,745 | 6/1965 | Van Reymersdal | 250—219 |
| 3,225,176 | 12/1965 | Jones | 250—219 |

RALPH G. NILSON, *Primary Examiner.*

M. ABRAMSON, *Assistant Examiner.*